(12) United States Patent
Guiter et al.

(10) Patent No.: US 7,346,778 B1
(45) Date of Patent: Mar. 18, 2008

(54) SECURITY METHOD AND APPARATUS FOR CONTROLLING THE DATA EXCHANGE ON HANDHELD COMPUTERS

(75) Inventors: Olivier Guiter, Mireval (FR); Thierry Martel, Jacou (FR); Regis Nicolas, Jacou (FR)

(73) Assignee: PalmSource, Inc., Sunnyvale, CA (US)

( * ) Notice: Subject to any disclaimer, the term of this patent is extended or adjusted under 35 U.S.C. 154(b) by 607 days.

(21) Appl. No.: 09/726,822

(22) Filed: Nov. 29, 2000

(51) Int. Cl.
*H04K 1/00* (2006.01)
*H04L 9/00* (2006.01)
*G06F 11/30* (2006.01)
*G06F 7/04* (2006.01)
*G06F 17/30* (2006.01)
*G06K 9/00* (2006.01)
*G06F 13/28* (2006.01)
*G06F 3/00* (2006.01)
*G06F 5/00* (2006.01)

(52) U.S. Cl. ............... 713/182; 380/274; 380/255; 726/27; 726/28; 726/29; 726/30; 726/17; 710/28; 710/36; 710/37

(58) Field of Classification Search ........ 713/200–202, 713/172, 182; 395/281, 200; 380/21, 274, 380/255; 705/76; 707/201, 202; 726/2, 726/9, 20, 17, 27–30; 710/28, 36, 37
See application file for complete search history.

(56) References Cited

U.S. PATENT DOCUMENTS

| 4,593,353 | A | * | 6/1986 | Pickholtz | 705/55 |
|---|---|---|---|---|---|
| 5,239,166 | A | * | 8/1993 | Graves | 235/380 |
| 5,600,800 | A | * | 2/1997 | Kikinis et al. | 710/303 |
| 5,887,063 | A | * | 3/1999 | Varadharajan et al. | 713/172 |
| 6,157,825 | A | * | 12/2000 | Frederick | 455/410 |
| 6,286,099 | B1 | * | 9/2001 | Kramer | 713/172 |
| 6,418,534 | B1 | * | 7/2002 | Fogle | 713/202 |
| 6,480,101 | B1 | * | 11/2002 | Kelly et al. | 340/10.2 |
| 6,549,917 | B1 | * | 4/2003 | Pollard et al. | 707/201 |
| 2001/0011308 | A1 | * | 8/2001 | Clark et al. | 710/20 |

* cited by examiner

*Primary Examiner*—Ayaz Sheikh
*Assistant Examiner*—Shin-Hon Chen
(74) *Attorney, Agent, or Firm*—Berry & Associates P.C.

(57) ABSTRACT

A method and system for protecting portable computer data from unauthorized transfer or using portable computers to download unauthorized data. The invention is applicable to any computer capable of transferring data, but in one embodiment a portable computer is described. Authorization is enabled by an interface permitting synchronization of the portable computer with a host computer by authentication of the particular portable computer identity. For instance, in one embodiment, when a portable computer is docked with a compatible interface connected to a host desktop computer, it is sensed and identified by the interface. If the particular portable computer identity is authenticated as authorized for that desktop, then synchronization will be enabled by the interface. The computers may then transfer data. However, if the identity is not an authorized one, then authentication will not occur, synchronization is correspondingly disabled, and data transfer is prevented. Various systems can enable the identity authentication.

25 Claims, 12 Drawing Sheets

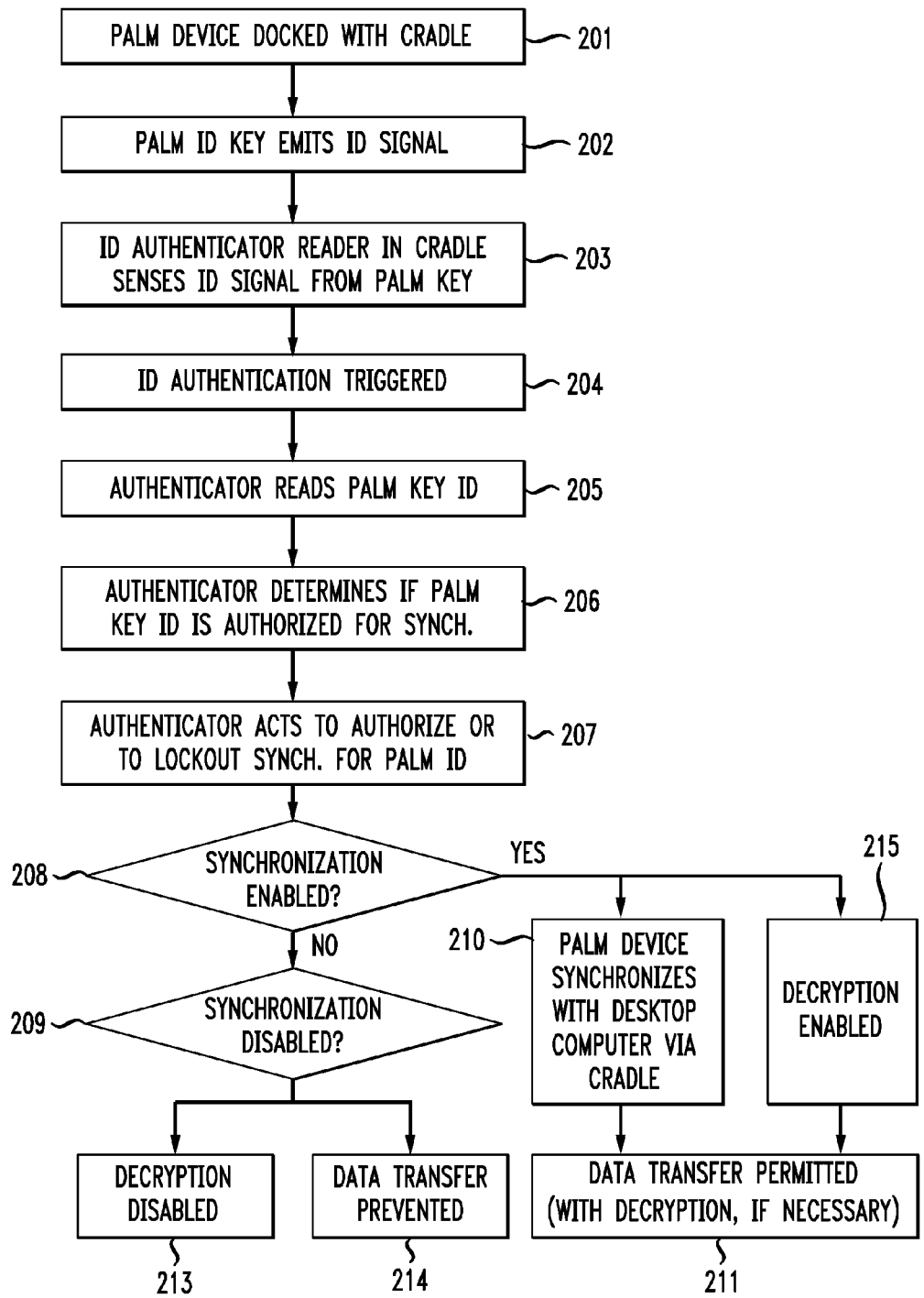

SECURITY METHOD AND APPARATUS FOR CONTROLLING THE DATA EXCHANGE ON HANDHELD COMPUTERS

BACKGROUND OF THE INVENTION

1. Field of the Invention

The present invention relates to the field of portable devices such as handheld palmtop computer systems or personal digital assistants. Specifically, the present invention relates to a method and apparatus for securely controlling the data exchange on handheld computers.

2. Related Art

As the components required to build a computer system have reduced in size, new categories of computer systems have emerged. One of the more recent categories of computer systems is the portable or handheld "palmtop" computer system, or personal digital assistant (PDA). A portable computer system such as a palmtop computer may include a hand held device and an interface device. The hand held portable device may be the actual portable computer device. The interface device may provide the docking mechanism to which the portable computer device ports and which then connects to the portable computer device and synchronizes it to other computers to allow the computers to communicate and exchange data. An example of such an interface device is a palmtop computer system cradle device. Due to the small size and portability of portable computers such as the palm top computers, they may be brought anywhere by anyone to port with another computer, such as a desk top personal computer, docked via a compatible interface such as a palmtop computer system cradle device then presently connected to the desktop computer, synchronized with the other computer via the interface device, and used to access data therefrom by data transfer.

A lack of security may result with the synchronization mechanism. This can result because anyone, not just the owner of certain data or a designated, authorized user of such data, may be able to access these data stored on a portable computer, or use a portable computer to access the data stored on another computer such as a desktop personal computer by synchronizing the portable computer to the desktop computer through a compatible portable computer system interface device, such as palmtop computer system cradle device then presently connected to the computer at the desktop station. Further, even authorized data users may access the data in an unauthorized manner using a portable computer. These are especially serious problems given the small size, portability, and concealability of portable computers, coupled with their significant data storage and communication capabilities.

For instance, the owner or authorized user may misplace a portable computer such as a palmtop device, or the portable computer may be misappropriated. If an unauthorized person inadvertently or wrongfully acquires a portable computer such as a palm top device belonging to someone else and containing data valuable to the owner and confidential in nature, the unauthorized person may attempt to access the data contained therein. The unauthorized person may attempt this by taking the inadvertently misplaced or wrongfully acquired palm top device to a desktop station to which he or she has access where a computer is connected to a compatible cradle device, docking the palm device to the cradle device, synchronizing the computers via the cradle device, and downloading the data stored on the palm device to the desktop computer.

In another instance, a person possessing a portable computer such as a palm top device of their own may attempt to access sensitive valuable data from a desktop computer then presently connected to a compatible cradle device without authority to do so by taking their own palmtop device to the unauthorized desktop computer, docking their palm device to the cradle device then there connected, synchronizing the computers, and downloading the unauthorized, sensitive data.

Another example could involve persons normally authorized to access sensitive valuable data in certain specific, limited manners, such as data transactions on specified desktop computers during normal business hours under supervision. In this instance, such persons may use their own concealed portable computers to access and copy such data after hours or when supervisory attention is diverted, for later unauthorized, unsupervised access or later transfer to other, unauthorized computers, elsewhere.

To the owner of computer stored information, data thus stored may be sensitive, confidential, valuable, and possibly irreplaceable. The unauthorized acquisition of such data by persons other than the owner or persons authorized by the owner, or use in unauthorized ways by persons who may under other circumstances be authorized can be damaging. Consequently, it is desirable to discourage synchronization of portable computers such as palmtop devices to other, unauthorized computers such as desktop or laptop computers, or other data transfer, storage, or communication systems, via compatible interfaces, such as palm top computer system cradle devices.

Further, portable computers such as palmtop devices may be considered valuable, easy to appropriate and conceal, and thus tempting items for theft. However, over and above any intrinsic value inherent in the portable computer itself, the data a particular portable computer may contain may be even more valuable, and hence a more tempting target for a thief aware of this content and its value. Thus, beyond preventing loss of the portable computers themselves, it is desirable to deter theft of palm devices to protect the data they contain. Consequently, the desirability of discouraging unauthorized synchronization of palmtop devices to compatible cradle devices extends to deterring theft of palmtop devices.

In the prior art, one method for protecting against unauthorized use of a portable computer system and against unauthorized access to data stored therein is to use a password access program to enable synchronization with another computer. However, passwords have proven inefficient, inconvenient, and ineffective in providing an acceptable level of protection against unauthorized access to and transfer of data. There are a number of reasons for this inherent insufficiency of password protection in this particular application.

One reason is that experience shows that passwords can be defeated by unauthorized users, especially by persons determined to gain unauthorized access to valuable, sensitive, password protected data. Also, passwords may be easily suppressed or bypassed by authorized users, often are, and correspondingly may not provide the protection they were designed to provide. It is also sometimes possible for knowledgeable unauthorized users to bypass or suppress passwords, rendering data totally unprotected. Persons aware of the nature and value of, and willing to attempt unauthorized access to particular data may be especially so capable. Thus, password protection may not provide a sufficient level of security for valuable, sensitive data.

Further, many users consider passwords to be vexing, cumbersome, and difficult to remember. Passwords are known to occasionally lock out even authorized users from data needed for legitimate applications. These annoyances sometimes lead even authorized users to bypass or suppress them. Thus, passwords have proven annoying and inconvenient, in addition to not providing adequate protection.

SUMMARY OF THE INVENTION

Accordingly, what is needed is a method and system that can prevent unauthorized synchronization of palm devices with cradle devices to prevent unauthorized access to data. What is also needed is a system and method that can satisfy the above needs and that is transparent to the user and convenient. The present invention provides these advantages and others not specifically mentioned above but described in the sections to follow.

A method and system for protecting data contained within portable computers from transfer to unauthorized computers and prevent using portable computers to download unauthorized data from such computers. The invention can be applied to any computer having the capability to transfer data, but in one embodiment a portable computer is described herein. Authorization is enabled by an interface permitting synchronization of the portable computer with a host computer by authentication of the particular portable computer identity. For instance, in one embodiment, when a portable computer is docked with a compatible interface connected to a host desktop computer, it is identified by the interface through contacts or contact free sensing. If the particular portable computer identity is authenticated as one authorized to communicate with that desktop, then synchronization of the portable computer with the desktop for communication will be enabled by the interface. The portable computer may then communicate with the desktop and transfer data. However, if the portable computer identity is not one which is authorized for communication with the desktop, then authentication will not occur, synchronization will correspondingly be disabled by the interface, and communication between the portable computer and the desktop will be prevented. Various systems can be used to enable the identity authentication. In one embodiment, a contact free magnetic key is used. In another embodiment, the identifying system also encrypts all data transferred to a key value specific to the unique identity, such that unauthorized external applications are forbidden from access to the data.

In one implementation of the present invention, an identifying tagging mechanism is added to the internals the portable computer device, and a compatible reader mechanism is added to the opposite interface device. The reader mechanism contains a list of tagging mechanism identities acceptable to it, and authorizes synchronization only to devices with acceptable identities, and prevents synchronization with devices with unacceptable identities. For example, a tagging mechanism is in a palmtop device and a tag reader mechanism is in a cradle device. In another embodiment, the interface device contains the identifying tag, and the reader mechanism will be in the portable computer device. This will allow a single portable computer device to access an authorized network or group of cradles. Another embodiment relies on encryption, wherein the synchronized data is encrypted with a specific key value from the identifying tag component to forbid accessing the synchronized data from an external application.

In one embodiment, the tag/reader communication between the portable computer device and the interface device occurs electrically through compatible contacts on each device. In other embodiments, the tag/reader communication is established without direct electrical contact through magnetic, infrared or other electromagnetic emissions from one device, such as a palmtop computer device, being sensed and read by the other device, such as a cradle device. Other embodiments apply combinations of these mechanisms.

Thus, in accordance with the present invention, when compatible devices interface, one of which possesses an identity acceptable to the reader in the opposite device, synchronization is enabled, and data transfer is authorized accordingly. If the identity is unacceptable to the reader, synchronization is disabled, and data transfer prohibited, preventing unauthorized access to data, and without resort to password use.

In accordance with the present embodiments, data security, a critical point with portable computer devices, is greatly strengthened.

BRIEF DESCRIPTION OF THE DRAWINGS

FIG. 12 is a flow chart depicting a the portable computer system palm device identity authentication process between a palm device and compatible cradle device, in accordance with one embodiment of the present invention.

DETAILED DESCRIPTION OF THE INVENTION

Figure 1:
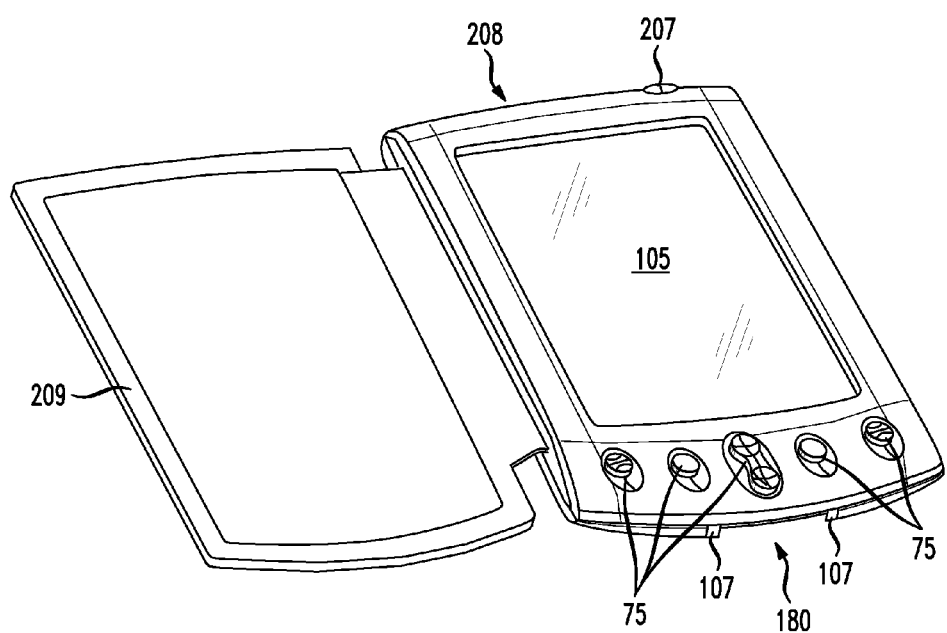
FIG. 1 depicts a typical palm top portable computer system, as in one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant, with the capability to access data on other computers through connection via compatible interfaces, such as cradle devices. However, it is appreciated that the present invention can be used with other types of devices that have the capability to access some type of central device or central site, including but not limited to desktop and laptop computer systems.

Exemplary Palmtop Platform

An exemplary portable palm top computer 100 which may incorporate an embodiment of the present invention is depicted in FIG. 1. Palm top computer 100 is small enough to fit in the palm of a user's hand. It is correspondingly lightweight, thin, and conveniently portable. Hence, it is eminently concealable. Notwithstanding this diminutive structure, exemplary portable palm top computer 100 contains a memory unit of relatively sizable capacity, a processor, and significant interface, communications, and data transfer capabilities facilitated by internal components not shown. These and other operative components of exemplary palm top computer 100 may be contained within an enveloping tough plastic body structure 208 with attached, hingeably closing cover structure 209 which may be closed over the face of body structure 101 so as to protect various externally accessible components of the computer. Such components may include a display screen 105, which in some embodiments may be capable of providing user interaction capabilities such as alphanumeric and command input, and stylus enabled on screen writing, and control devices 106. A power switch 207 may be mounted in some embodiments as depicted on an accessible edge of body structure 101. There may be embodiments of palm computer system 100 with interconnection capabilities enhanced or enabled by externally accessible contacts 180 mounted in slot 107, which is recessed into an accessible edge of body structure 208.

Figure 2:
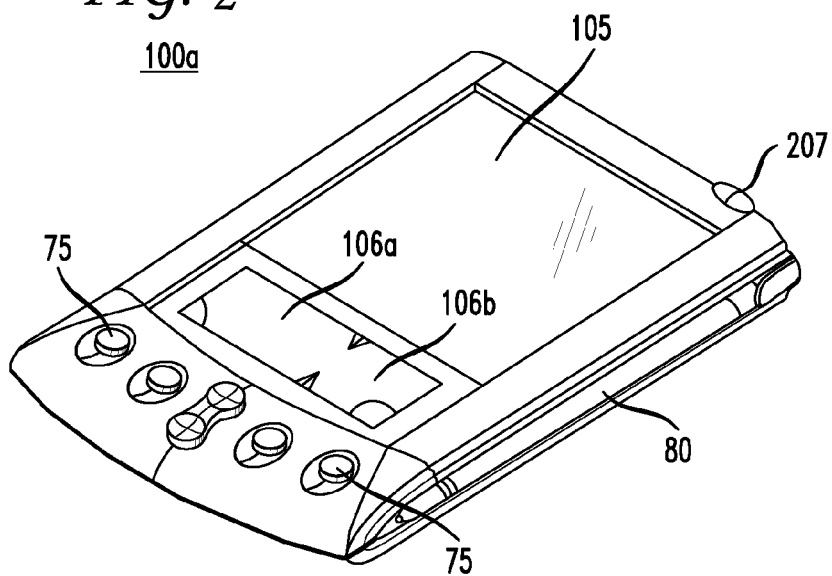
FIG. 2 is a top side perspective view of a portable palm top computer system, in accordance with one embodiment of the present invention.

FIG. 2 is a perspective illustration of the top face 100a of a one palmtop computer. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The power button 207 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
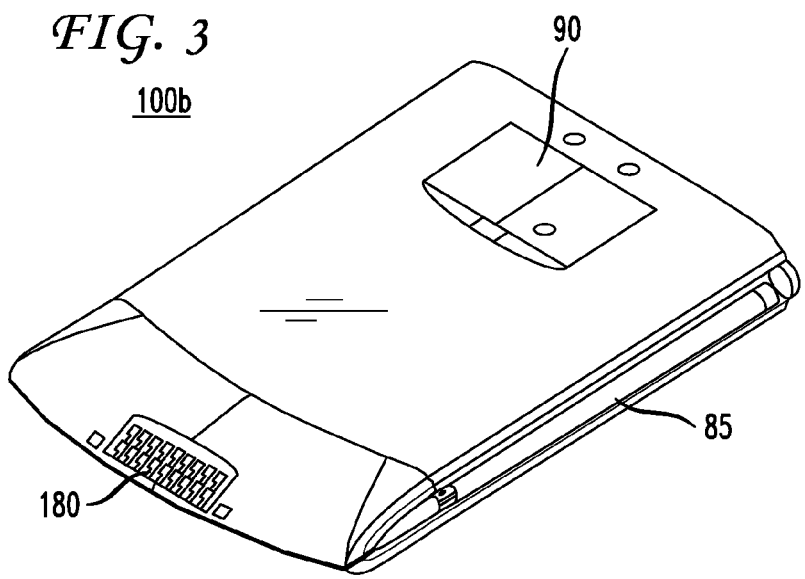
FIG. 3 is a bottom side perspective view of the portable palm top computer system of FIG. 2.

FIG. 3 illustrates the bottom side 100b of a palmtop computer system. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc. In one embodiment of the present invention, identification authentication information may flow over contacts in communication interface 180.

Figure 4:
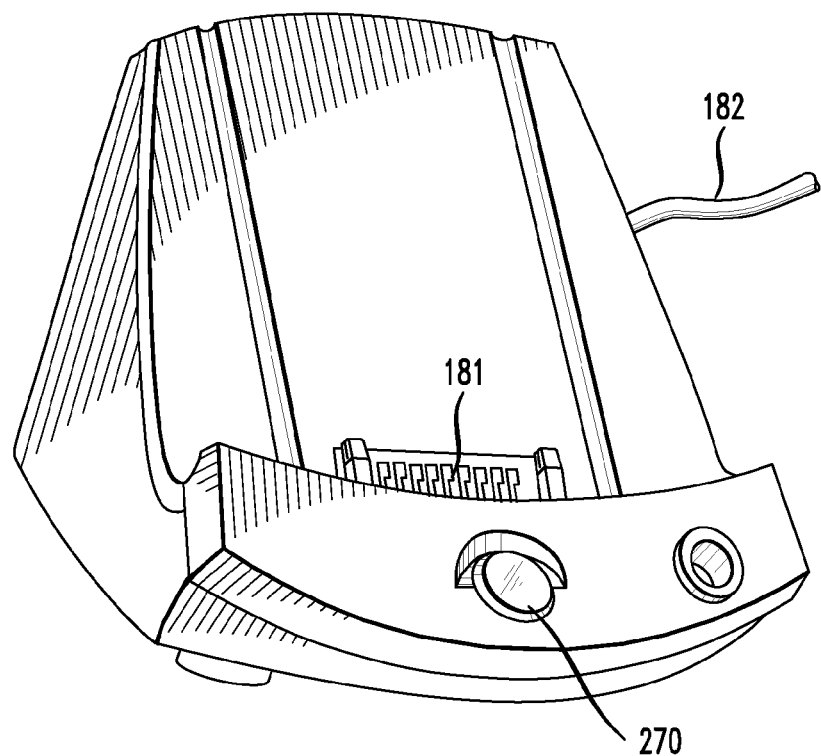
FIG. 4 depicts a perspective view of the cradle device for connecting the portable palm device to other systems, such as a desktop computer system via a communication interface in accordance with one embodiment of the present invention.

FIG. 4 is a perspective illustration of one embodiment of the cradle 60 for receiving the palmtop computer system 100. Cradle 60 contains a mechanical and electrical interface 181 for interfacing with communication interface 180 (FIG. 3) of computer system 100 when system 100 is slid into the cradle 60 in an upright position. Once inserted, button 270 can be pressed to initiate two-way communication (e.g., a communication session) between computer system 100 and other computer systems coupled to communication interface 180. In one embodiment, communication between the palmtop computer system 100 and other computer systems flows through interface 181, connectors internal (FIG. 10) to cradle unit 60, and communication cable 182.

Figure 5:
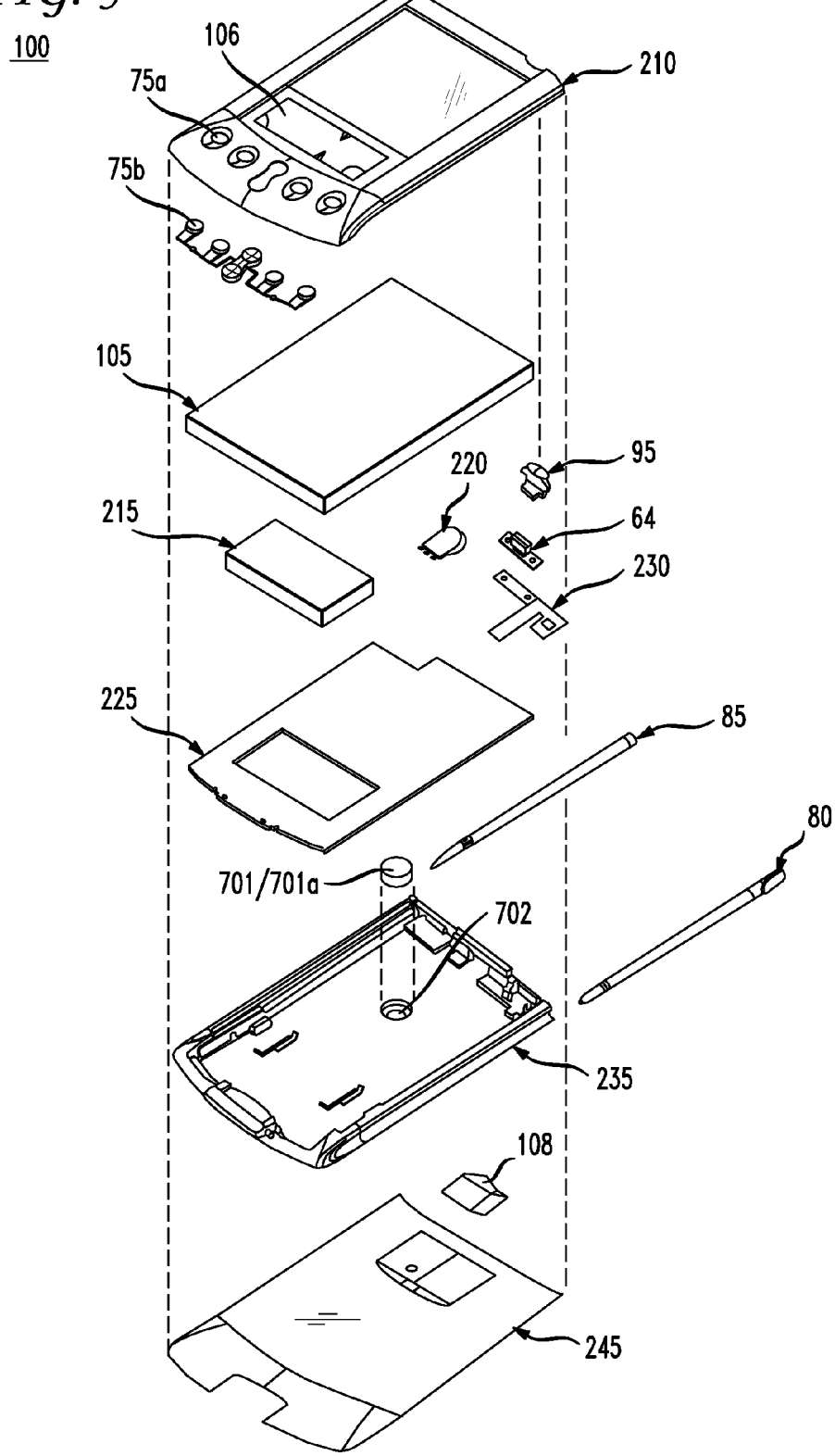
FIG. 5 is an exploded view of the components of the portable palm top computer system of FIG. 2.
Figure 9A:
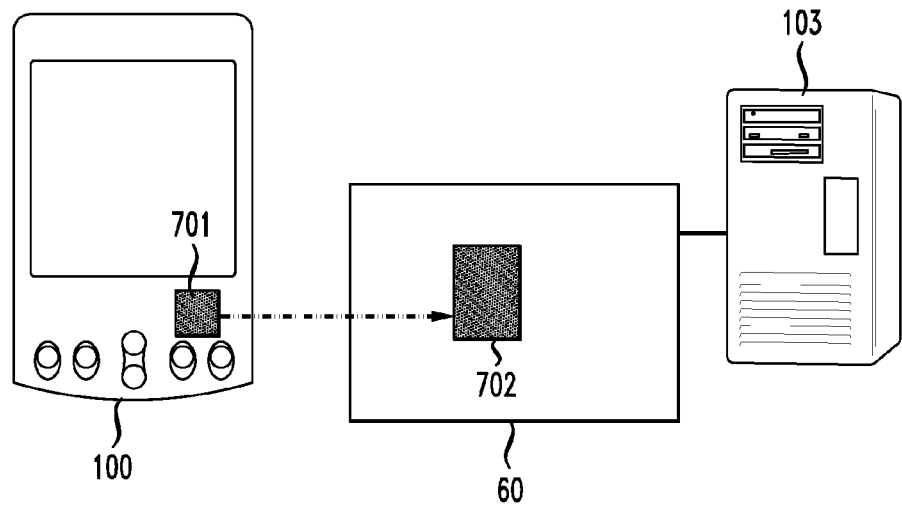
FIG. 9A depicts a palm device contact free identity authentication interaction between a magnetic security key in a palm device and a magnetic security key reader in a cradle device, in accordance with one embodiment of the present invention.
Figure 10:
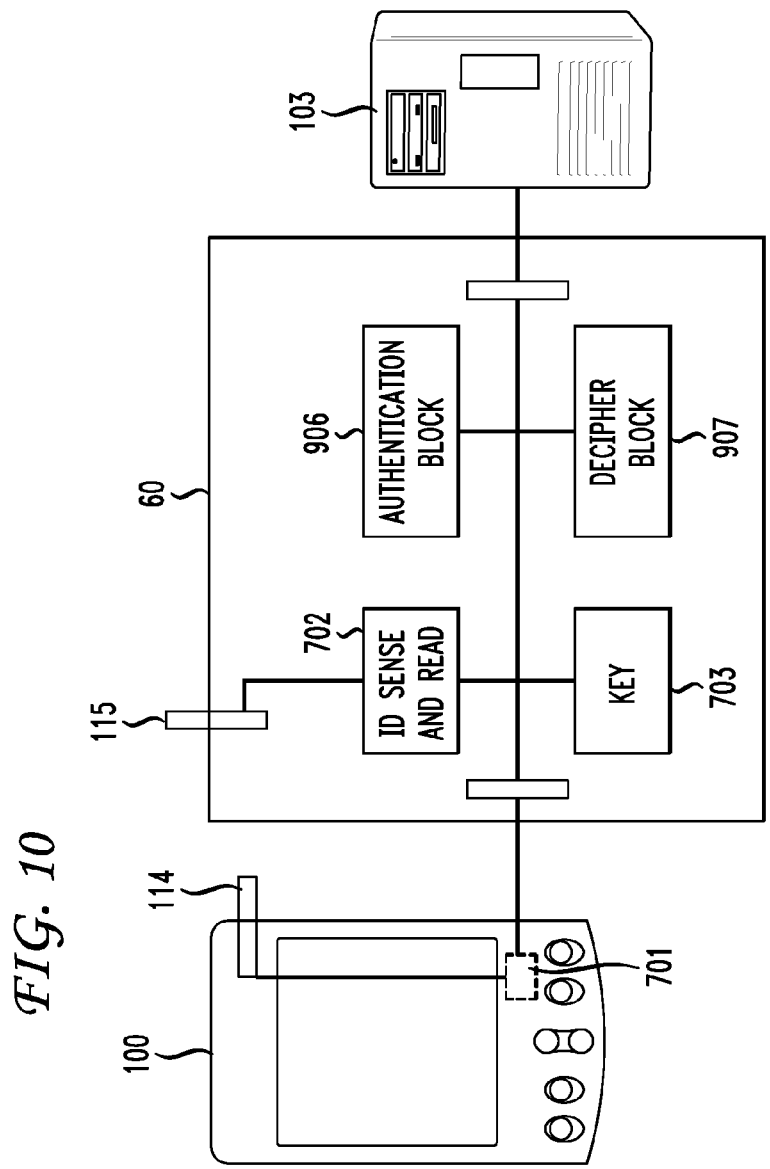
FIG. 10 illustrates an exemplary system of security assemblies within a portable computer system cradle device and enabling smart card components in both the cradle device and a palm device, in accordance with one embodiment of the present invention.

In some embodiments of the present invention, an identity authentication reader is housed within cradle device 60 (FIG. 9A) to sense identity authentication signals from an identifying authenticating signal sending component (701) within portable computer devices (FIGS. 5, 9A). In one embodiment of the present invention, the reader is a magnetic key reader, and the corresponding identity authentication is performed without contacts. In another embodiment, the reader is a smart card reader. In another implementation, identification authentication information flows from palm top device 100 through contacts in interface 180 on the palmtop device (FIG. 3) and 181 on cradle device 60 (FIG. 4), to a hard-wired sensing component within cradle device 60 (FIG. 10). Alternative embodiments of the present invention place an identification authentication tagging component within cradle device 60 and an identification sensing reader component within the palmtop device 100.

FIG. 5 is an exploded view of the palmtop computer system 100. Computer system 100 contains a back cover 245, and a front cover 210 having an outline of region 106 and holes 75a for receiving buttons 75b. A flat panel display 105 fits into front cover 210. The flat panel display unit 105 in one embodiment is a liquid crystal display (LCD). A rechargeable battery 215 provides electrical power. A manual contrast adjusting potentiometer 220 is also shown, as well as a power switch 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown. Infrared communication mechanism 64 (e.g., an infrared emitter and detector device) is for sending and receiving information from other similarly equipped devices. A signal (e.g., radio) receiver/transmitter device 108 is also shown. The receiver/transmitter device 108 is coupled to the antenna 85 and also coupled to communicate with the PC board 225.

In one embodiment of the present invention, midframe 235 bears a retaining recess 702, configured to mount and retain magnetic key 701. In an alternative embodiment, retaining recess 702 may mount and retain magnetic key reader mechanism 701(a). In other implementations, component 701 may be another tag mechanism and 701(a) another reader mechanism. In any of these particular embodiments, when palm top device 100 is slid into cradle device 60 (FIG. 4) in an upright position the reader mechanism senses and reads the corresponding opposite component, affecting contact free identification authentication.

In one embodiment of the present invention, contact free identification authentication information may be sent by the palmtop device via infrared communication mechanism 64 to a corresponding infrared communication mechanism in an interface device. In another embodiment, contact free identification authentication information may be sent by the palmtop device via transmitter/receiver component 108 to a corresponding receiver/transmitter component in an interface device.

In other embodiments of the present invention, identification authentication information may be transmitted over a combination of the aforementioned contact free vehicles, such as magnetic key (or other tagging mechanisms) 701 and infrared communication mechanism 64, magnetic key (or other tagging mechanisms) 701 and transmitter/receiver 108, and combining of all three aforementioned contact free vehicles, as well as other possible contact free vehicles. Also, the invention may be implemented combining any combination or all possible combinations of contact free identification authentication vehicles with communication over electrical contacts to/from hardwired identifying tagging/reading mechanisms in corresponding devices. Another possible implementation could include identification authentication to communication via electrical contacts between hardwired identifying tagging/reading mechanisms in corresponding devices.

Figure 6:
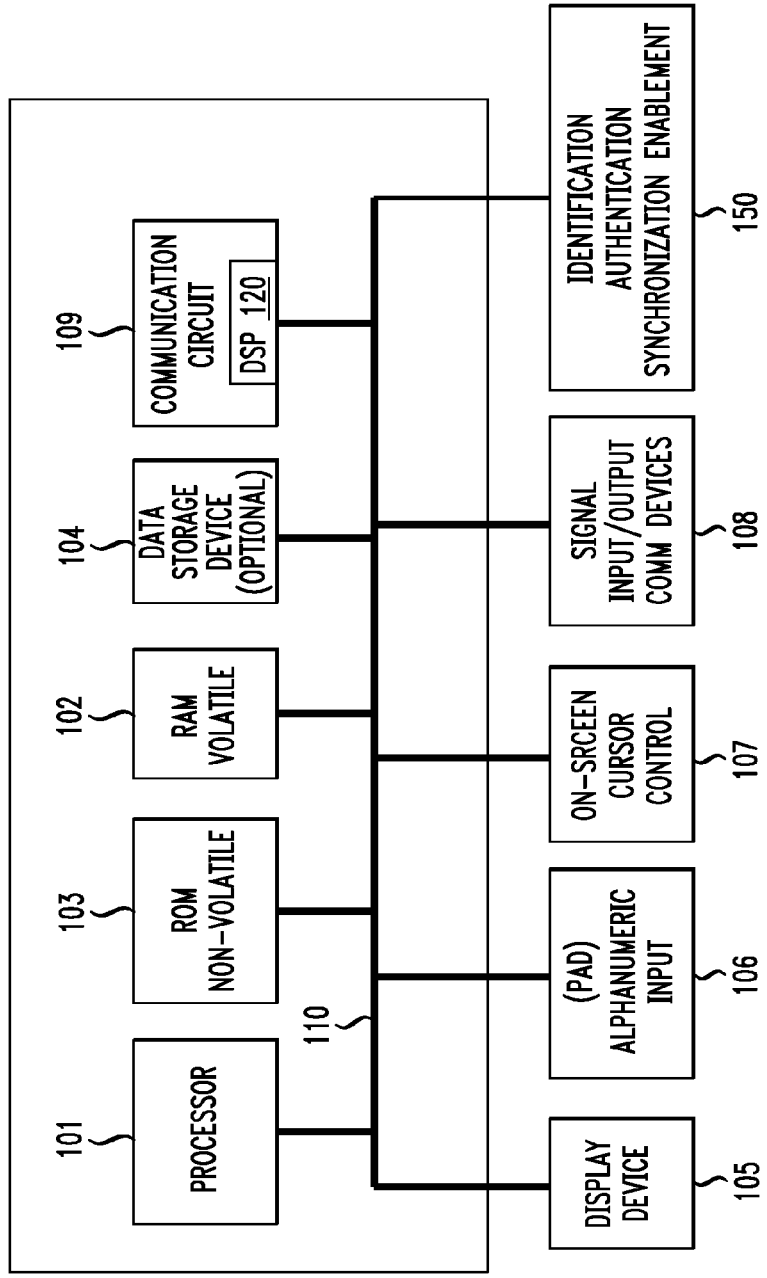
FIG. 6 is a block diagram of a portable computer system in accordance with one embodiment of the present invention.

FIG. 6 illustrates circuitry of computer system 100, some of which can be implemented on PC board 225 (FIG. 5). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. Computer system 100 also contains a display device 105 coupled to the bus 110 for displaying information to the computer user. PC board 225 can contain the processor 101, the bus 110, the ROM 103 and the RAM 102.

In one embodiment, an identification authentication and synchronization enabling mechanism 150 can also be placed on PC board 225. In another embodiment, the identification authentication reader device may be placed on PC board 225. In such an embodiment, the identification authentication sending device could be in the interface devices. Such an embodiment would enable a palm top device to synchronize with only certain interface devices with allowable identities. Another embodiment of the present invention may be a software based identification authentication scheme with which ROM 103 would be programmed.

With reference still to FIG. 6, computer system 100 also includes a signal transmitter/receiver device 108, which is coupled to bus 110 for providing a physical communication link between computer system 100, and a network environment. As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 5) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment of the present invention, identification authentication may be communicated via transmitter/receiver device 108 to an interfacing device such as a cradle (FIG. 4). Identification authentication and synchronization enablement capability may be incorporated into component 108 in one embodiment. In an alternative embodiment, such capability may be implemented through interaction between components 108 and 150.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120. Identification authentication capability may reside in communication circuit 109 in one embodiment of the present invention. In another embodiment, identification authentication capability may be a function of software. In this embodiment, a program within ROM 103 would direct operations of processor 101 to send identifying information via transmitter/receiver device 108. In an alternative embodiment, processor 101 may execute a program stored in ROM 103 to respond to identification authentication information from the interface device such as a cradle (FIG. 4).

Also included in computer system 100 of FIG. 6 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. Implementations of the present invention may include display of identification authentication and corresponding synchronization authorization and enablement, and of identification authentication refusal and corresponding synchronization prohibition and disablement.

Figure 7:
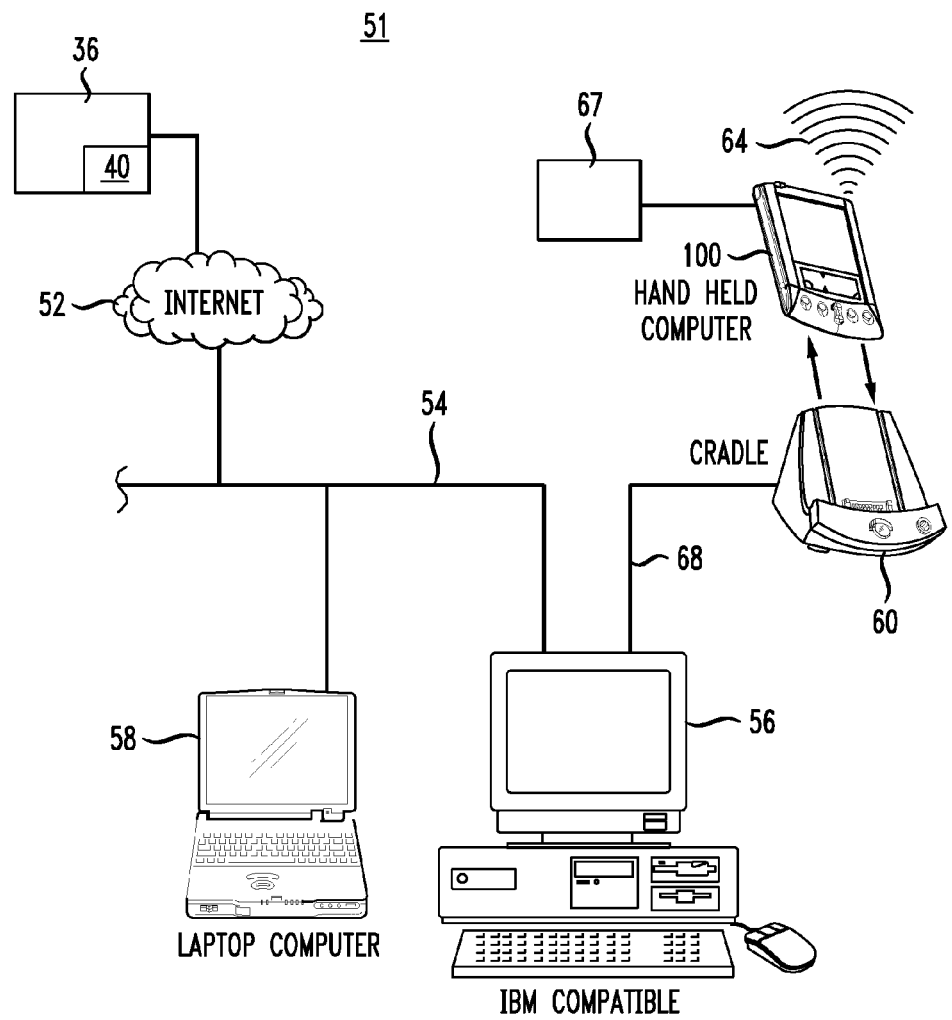
FIG. 7 is a block diagram of interrelationships possible via a portable computer system docking cradle device between a portable computer system and a network including a desktop or laptop computer system and connection to an external application, in accordance with one embodiment the invention.

FIG. 7 depicts a block diagram of a system in which the palm top device may be connected, illustrating the potential for far reaching data transfer making security features implemented by embodiments of the present invention useful. System 51 includes portable computer 100 in accordance with one embodiment of the present invention. Portable computer system 100 is also known as a palmtop computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment 67.

FIG. 7 shows an embodiment of a system 51 for coupling a portable computer system 100 to other computer systems and to the Internet 52 in accordance with the present invention. System 51 is described in the context of wired connections between its various devices and components; however, it is appreciated that wireless connections (such as but not limited to Bluetooth wireless connections) can also be used, with access enabled or disabled as desired in accordance with the present invention.

With reference to FIG. 7, system 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54 such as an Ethernet Local Area Network (LAN), but which can instead be any of a number of other types. Bus 54 can provide communication with the Internet 52 using a number of well-known protocols.

Importantly, in the present embodiment, host computer system 56 is also coupled via connector cable 68 to a cradle 60 for receiving and initiating communication with portable computer system 100 ("handheld computer") of the present invention. Connector cable 68 can be a serial bus (e.g., RS232), a parallel bus, a Universal Serial Bus (USB), or any other type of workable connection. Cradle 60 provides an electrical and mechanical communication interface between connector cable 68 and portable computer system 100 for two-way communications with host computer system 56. Portable computer system 100 also contains a wireless infrared communication mechanism 64 for sending and receiving information from other devices. It should be appreciated that in accordance with the present invention, any such communications may be enabled or disabled as desired by the selection of identifying authentication mechanisms recognized as allowable or prohibited by an authentication reading mechanism on an interface unit such as cradle 60, or in software within portable computer 100 or host system 56 or 58, or both the portable and host systems.

Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

The data and information which are communicated between network 51 via cradle 60 and portable computer system 100 are the same type of information and data that can conventionally be transferred and received over a public telephone wire network system. Also, a wireless communication system may be utilized to communicate data and information between portable computer system 100 and wireless communications systems. It should be appreciated that one embodiment of a wireless communication system in accordance with the present invention is the Mobitex wireless communication system.

Exemplary Invention Platform

It should be appreciated that any such communications may be enabled/disabled in accordance with the present invention in accordance with identification authentication and corresponding authorization/prohibition of synchronization of portable computers for communications and data transfer with telephone systems, either wire networks or wireless.

It should be further appreciated that other embodiments of a communications network, planned or envisioned, may be utilized in accordance with the present invention. For example, a wireless connection may be enabled/disabled between a certain portable computer system 100 containing an identification authentication mechanism allowing or prohibiting that system from accessing Internet 52.

It should be further appreciated that in some embodiments of the present invention involving certain mechanisms, control over synchronization of portable computers to other computers or communication systems through identification authentication may involve physical devices, such as magnetic keys and smart cards. For example, synchronizing portable computer 100 to network 51 via cradle 60 may be enabled by identification authentication implemented by a magnetic key in computer 100 and magnetic key reader in cradle 60, respectively. In other embodiments, some involving wireless communication directly from portable computer 100, identification authentication may be more appropriately implemented using a software based protocol.

Figure 8:
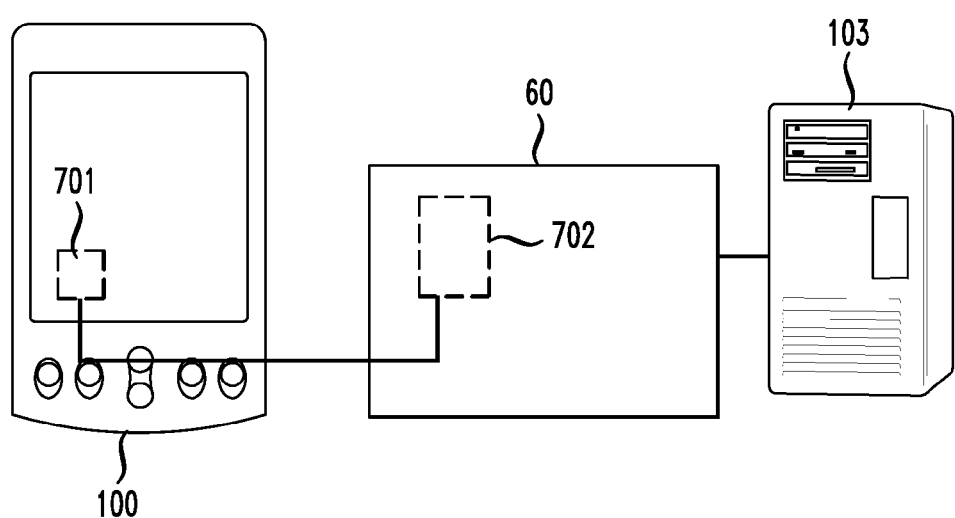
FIG. 8 depicts a simple communication interface between a portable computer system palm device via a portable computer system cradle device with a desktop PC, in accordance with one embodiment of the present invention.

FIG. 8 depicts a simple interconnection of a portable computer 100, such as a palmtop device, connected to a desktop personal computer 103 through interface device 60, which in one embodiment of the present invention may be a cradle device (FIG. 4). The present invention may be implemented with identification authentication information contained in identifying tag key mechanisms 701 embedded within palmtop device 100 and a corresponding identification authentication reader device 702 embedded within interface device 60. This arrangement allows for the interface device 60, connected to another computer such as exemplary desktop computer 103, but which could also be a laptop computer or some other data storage system or data communication system, to control the synchronization scenario by recognizing and correspondingly allowing identities of a single palmtop device or limited group of palm top units, and refusing identification authentication and correspondingly disallowing synchronization with all other palmtop devices.

Conversely, the invention may be implemented with identification authentication within an identifying tag key mechanism 701 embedded within a single interface unit or limited group of interface units (60) and an identification authentication reader mechanism 702 embedded within a palm top device or a certain limited group of such devices (100). This arrangement allows a particular palmtop device or limited group of palmtop devices (100) to access a single interface unit, or a limited group of interface units (60). This embodiment allows an added degree of flexibility in terms of which other computers a particular palm device, or a certain limited group of perhaps more securely controlled palm devices (100) may synchronize with.

FIG. 9A depicts a system of portable computers with contact free security components installed as in one embodiment of the present invention. Palmtop device 100 incorporates identifying magnetic key 701. Interface device 60 incorporates an identity authenticating magnetic key reader 702 that senses and reads information transmitted by magnetic key 701. Upon authentication of the identity of palmtop device 100 as an authorized device, magnetic key reader 702 authorizes enablement of communication between palmtop device 100 and desktop computer 60, which could also be a laptop computer, or any data storage or communication system.

In the event that reader 702 does not recognize key 701 as an authorized identity, identification authentication will not occur. In this event, synchronization of the portable computer 100 with exemplary desktop computer 103 will be disabled, communication between the computers will be prohibited, and accordingly, any data transfer will be disabled.

Other embodiments of the invention as depicted in FIG. 9A may assign the converse functions to components 701 and 702, such that identification reader 702 is embedded in palm top 101, and identification authentication tag 701 is embedded within interface 102. This arrangement allows a particular palm device or limited group of palm devices (100) to access a single interface unit, or a limited group of interface units (60). These embodiments allow an added degree of flexibility in terms of which other computers a particular palm device, or a certain limited group of perhaps more securely controlled palm devices (100) may synchronize with.

Figure 9B:
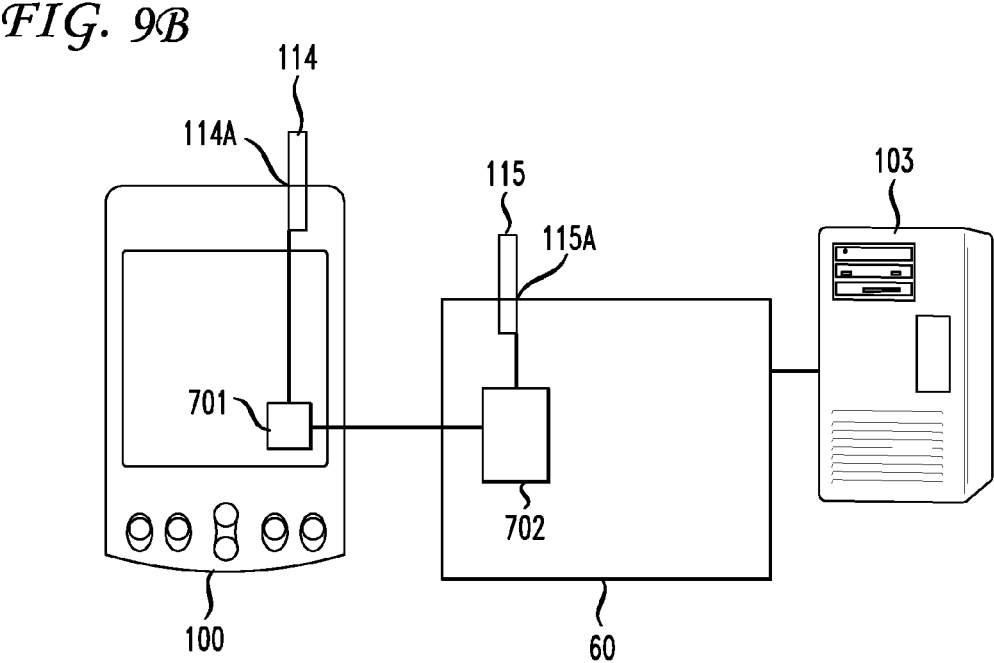
FIG. 9B depicts a system in which smart cards and compatible readers installed in a palm device, a cradle device, and in both serve as an identification authentication mechanism in several embodiments of the present invention.

FIG. 9B depicts an embodiment of the present invention in which smart cards, or equivalent identification tags enable key mechanisms 701 and 702, and serve as identification authentication tag components. Smart card 114 inserted into a slot 114(*a*) on palmtop device 100 triggers key mechanism 701 to signal reader mechanism 702. In this embodiment, smart card 114 must be inserted into slot 114(*a*) for the identity of palmtop device 100 to be authenticated by cradle 60. When a smart card 114 with a correct, allowable identity encoded thereon is inserted into the slot 114(*a*), it triggers key mechanism 701 to signal reader mechanism 702 to read the identity. The smart card identity is recognized by an identifying modality of reader mechanism 702 in cradle 60, and the identity of palmtop 100 is authenticated. Cradle 60 will accordingly enable palmtop 100 to synchronize with desktop computer 103, allowing data transfer. For any palm top without a smart card inserted, or with a smart card without a correct, allowable identification encoded thereon, identification authentication will not occur, synchronization will be disabled, and data transfer is correspondingly prohibited.

In an another embodiment, smart card 115 is inserted into slot 115(*a*) on cradle 60 and triggers reader mechanism 702. In this embodiment, smart card 115 must be inserted into slot 115(*a*) for cradle 102 to allow identity sensing, reading, recognition and authentication of the identity of palmtop device 100, or a certain limited group of similarly identified palmtops. Alternatively, smart card 115 must be inserted into slot 115(*a*) for a palm top or certain limited group of palmtops equipped with identification reader mechanisms 702 to recognize a particular cradle 60 equipped with an identifying tag key mechanism. In this case, when a smart card 115 with a correct, allowable identity encoded thereon is inserted into the slot 115(*a*), it triggers key mechanism 701 to signal reader mechanism 702 and smart card identity is recognized by an identifying modality of reader mechanism 702. The corresponding identity is authenticated. Cradle 60 will accordingly enable palmtop 100 to synchronize with desktop computer 103, allowing data transfer. Cradle 60, without its smart card 115 inserted, will not allow any identification authentication. Thus, synchronization with any palmtops will be disabled, and data transfer is correspondingly prohibited. Placing the smart card within a cradle connected at a certain desktop station provides protection of that station from unauthorized synchronization with portable computers. It should be appreciated that these features may be combined to provide customized data security arrangements in other embodiments of the present invention, such as requiring compatible smart cards 114 (in palmtop 100) and 115 (in cradle 60), each bearing a corresponding identity code to enable synchronization authorizing identification authentication. Any of the aforementioned embodiments may be implemented utilizing electrical contact between palmtop 100 and cradle 60, as via components 180 and 181 (FIGS. 3 and 4, respectively).

Figure 9C:
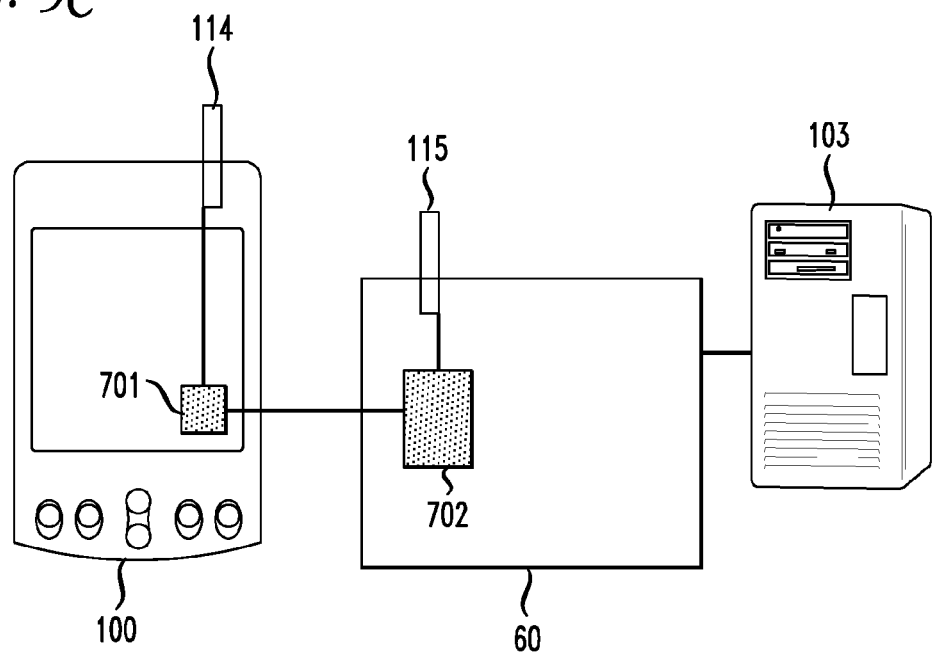
FIG. 9C depicts a system incorporating contact free communication of identification authentication information in accordance with several implementations of the present invention.

However, as depicted in FIG. 9C, any of the aforementioned embodiments using smart cards or equivalent identification tags may also be implemented using contact free interface mechanisms between palmtop 100 and cradle 60. Contact free implementation may be accomplished via magnetic keys, as discussed above, infrared communication device 64 or transmitter/receiver 108 (FIG. 5), or some mechanism of similar contact free capability.

Smart cards or equivalent identification mechanisms allow a measure of flexibility in designating portable computers for authorized recognition by an interface unit such that they may synchronize via the interface with other computers connected. This flexibility includes the ability to control which smart cards are issued to which portable computer user under various circumstances. Other embodiments of the present invention are possible, including embedding an assigned identification within portable computers and interfaces at the factory, during manufacture and reworking, and flashing assigned, allowable identifications into portable computers and interfaces at user's own facilities. Such embodiments enable authorization levels of various identified portable computers to be fixed, or to be changed, as for example, as a user's security clearance changes.

FIG. 10 depicts the interconnection of portable computer 100, which may be a palmtop computer, with exemplary desktop computer 103, which may also be a laptop computer or any data storage or communication system, via interface device 60, which may be a cradle, but which may also be any compatible interface. In the depicted embodiment, identification authentication mechanisms include smart card 114 on portable computer 100, and 115 on cradle 60. Cradle 60 may also contain an authentication block 906, which in one embodiment could be an application specific integrated circuit (ASIC). Also present in cradle 60 are key mechanism 703 and decryption mechanism 907. In one embodiment, smart card 114 serves as an identification tagging mechanism for palmtop 100, which is connected to cradle 60 through contacts 180 (FIGS. 1, 3) or any contact free mechanism. Smart card 115 provides a list of acceptable palmtop identities to authentication block 906. If the identity of palmtop 100 is on the list of acceptable identities, authentication block 906 causes key mechanism 703 to allow palmtop 100 to synchronize with desktop 103 via the interface provided by cradle 60. Communication thus enabled, data transfer between the computers is permitted.

Data transmitted by palmtop 101 may be in an encrypted format. One embodiment of the present invention allows decryption by a deciphering block 907 within cradle 60. In this embodiment, if the identity of palmtop 100 is on the list of acceptable identities programmed by smart card 115, authentication block 906 causes key 703 to allow synchronization and simultaneously engages deciphering block 907 to decrypt the data transmitted from palmtop 100 via cradle 60 to desktop 103. Decryption is disabled if synchronization does not occur, providing an added layer of security for data on palmtop 100. It should be appreciated that other decryption mechanisms may be utilized in alternative embodiments including software based methods.

In another embodiment if the present invention, a list of authorized palmtop identities may be preprogrammed such that no user provided lists may be implemented. In certain applications, this may be preferable as providing an additional layer of security, for example, from an unauthorized user who somehow acquires a smart card access authority list that could be used to initiate synchronization of a desktop with an unauthorized palmtop.

Figure 11:
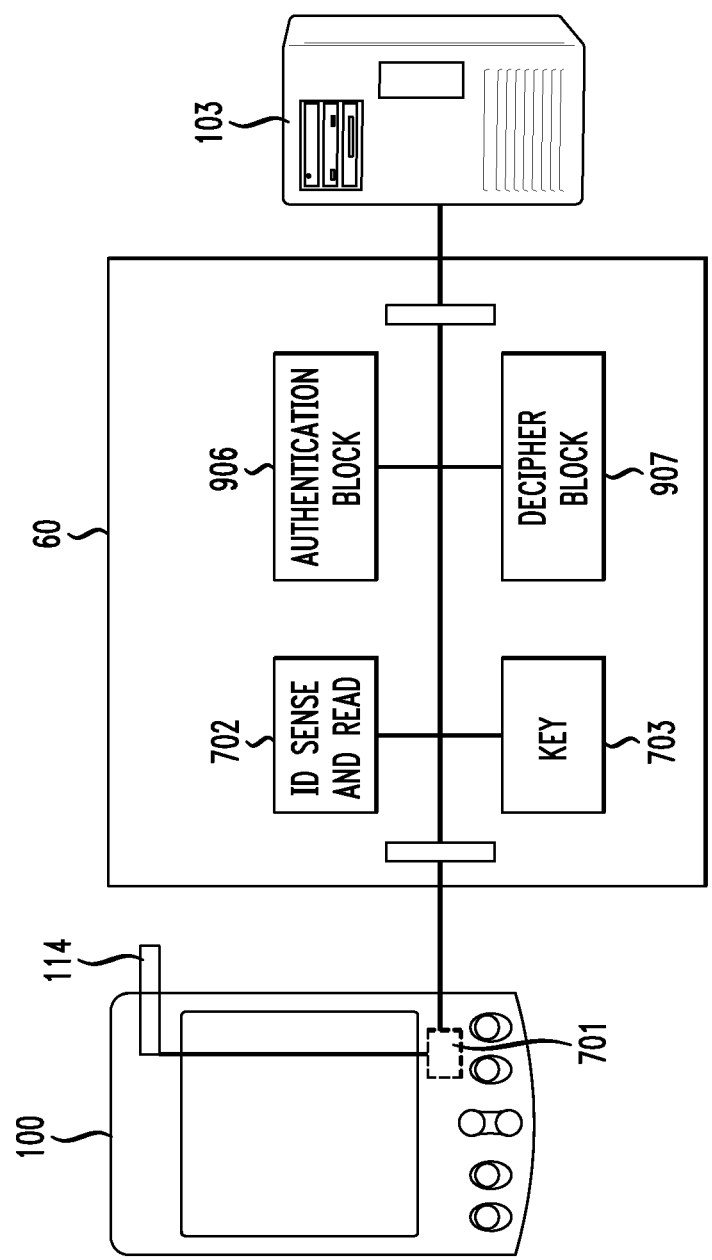
FIG. 11 illustrates an exemplary system permitting encryption and communication of data from a key authenticated palm device by security assemblies within a cradle device, in accordance with one embodiment of the present invention.

FIG. 11 depicts exemplary palmtop 100, identified by smart card 114 and connected to exemplary cradle 60. Authentication block 906, which in one embodiment may be an ASIC containing a preprogrammed list of acceptable palmtop identities, recognizes the identity of palmtop 100. Such a preprogrammed identity acceptability list may be installed at the factory during manufacture or rework. Programmability is possible in some embodiments by enabling changes to the list of programmed acceptable identities by flashing at a user's facility. If palmtop 100 lacks a smart card, or if its smart card is not programmed with an authorized identity code, authorization block 906 will not authenticate palmtop 100 and accordingly will disable synchronization, preventing data transfer. If palmtop 100 has a smart card programmed with an authorized identity code, authentication block 906 authenticates the identity of palmtop 100 and acts to cause key mechanism 703 to enable synchronization, thus allowing data transfer. In one embodiment, authentication block 906 also then acts to enable decryption block 907, to decipher encrypted data transmitted by palmtop 100 to exemplary desktop 103. If authentication block 906 disables synchronization to an unauthorized identity, it will also disable decryption by not enabling decryption block 907.

FIG. 12 depicts an exemplary process 200 by which data transfer is enabled or disabled between a portable computer and another computer or data storage or communication system in one implementation of the present invention. In step 201, a portable computer such as a palmtop device, seeking to be placed into communication with for example a desktop computer is docked with a compatible interface device, such as a palmtop computer cradle, connected to the desktop computer. When docked, step 202 occurs, wherein the identification tag or key within the palmtop computer, such as a magnetic key, emits a signal bearing encoded identification information. An identification authentication reader mechanism within the cradle senses this emission, step 203. This triggers step 204, the authentication of the palmtop identity by the cradle, wherein an authentication capability of the identification reader mechanism is activated. The authentication capable reader mechanism executes step 205, reading the palmtop identity information. It then determines if this palmtop identity being read is one that is authorized for synchronization through the cradle, step 206. It acts accordingly to authorize or lockout synchronization in step 207 by triggering other mechanisms within the cradle, such as the key block 107 of FIG. 10, for example. In step 208, synchronization is either enabled or disabled. If it is disabled, step 209, any decryption mechanism is also disabled in step 213, and data transfer is prevented in step 214. If synchronization is enabled, the palmtop computer synchronizes with the desktop computer via the cradle, step 210, and decryption is also enabled, step 215. Upon synchronization, in step 211 data transfer is permitted, with decryption, if necessary. It should be appreciated that analogous alternatives to some of these steps are possible in various embodiments of the present invention.

For example, steps may be added to allow operational steps involving contact free transmission of identification authentication information.

In summary, in accordance with an implementation of the present invention, these security measures prevent unauthorized data transfer between portable computers and other computers and data storage and communications systems. Thus, they are effective ways of promoting security of data on both portable computers and computers to which they may be synchronized. Also, these security measures are automatically implemented in the otherwise necessary process of docking a portable computer with an interface to synchronize it with another computer to which the interface is attached, and thus they are convenient and user friendly.

Additionally, once it is understood that unauthorized data transfer with the portable computer will be disabled by these security measures and thus unavailable to unauthorized users of the portable computer, the likelihood of theft of such portable computers for the data they contain will almost certainly decrease. Thus, these data security measures also deter theft of the portable computers, themselves.

Thus, the present invention provides a convenient, user friendly method and system that can effectively disable unauthorized transfer of data from or to a portable computer, preventing unauthorized extraction of data from portable computers by downloading to other computers and data storage and communications systems, preventing the use of portable computers to download unauthorized data from such computers and systems, and deterring theft of portable computers for the data they may contain.

A method and system for protecting data contained within portable computers from transfer to unauthorized computers or using portable computers to download unauthorized data from such computers. The invention can be applied to any computer having the capability to transfer data, but in one embodiment a portable computer is described herein. Authorization is enabled by an interface permitting synchronization of the portable computer with another computer by authentication of the particular portable computer identity. For instance, in one embodiment, when a portable computer is docked with a compatible interface connected to a desktop computer, it is identified by the interface through contacts or contact free sensing. If the particular portable computer identity is authenticated as one authorized to communicate with that desktop, then synchronization of the portable computer with the desktop for communication will be enabled by the interface. The portable computer may then communicate with the desktop and transfer data. However, if the portable computer identity is not one which is authorized for communication with the desktop, then authentication will not occur, synchronization will correspondingly be disabled by the interface, and communication between the portable computer and the desktop will be prevented. Various systems can be used to enable the identity authentication. In one embodiment, a contact free magnetic key is used. In another embodiment, the identifying system also encrypts all data transferred to a key value specific to the unique identity, such that unauthorized external applications are forbidden from access to the data.

A method and system for preventing unauthorized transfer of data between a portable computer system and systems of data storage and communication including other computers, wherein identification authentication information is received for portable computer system devices which express a unique identity for that portable computer system device, the identification authentication information is compared with a list of authorized portable computer system device identities, determination is made as to whether the portable computer system device identity is authorized based on the identification authentication information received about the unique identity, and synchronization enabling or disabling communication between the portable computer system and the systems of data storage and communication including other computers is authorized or prohibited accordingly. In one embodiment, encryption of data transferred from the portable computer system is made to a specific key value corresponding to the unique identity.

An embodiment of the present invention as methods and systems for applying identification authentication to accordingly enable or disable synchronization of portable computers via their interfaces with other computers is thus described. While the present invention has been described in particular embodiments, it should be appreciated that the present invention should not be construed as limited by such embodiments, but rather construed according to the below claims.

What is claimed is:

1. A method for preventing unauthorized transfer of data between a portable computer system and systems of data storage and communication including another computer, said method comprising:
    a) automatically receiving identification authentication information for said portable computer system at a communication interface device embodied as a cradle for said portable computer system, wherein said authentication information comprises a unique identity for said portable computer system and wherein said authentication information is embedded in said portable computer system;
    b) comparing at said communication interface device said identification authentication information with a list of authorized portable computer system identities corresponding to said system of data storage;
    c) determining at said communication interface device whether said portable computer system identity is authorized based on said identification authentication information and said unique identity;
    d) enabling at said communication interface device communication between said portable computer system and said other computer provided said identity is authorized and disabling said communication if said identity is not authorized; and
    e) enabling at said communication interface device decryption of encrypted data and synchronization with said systems of data storage from said portable computer system provided said identity is authorized and disabling decryption if said identity is not authorized.

2. The method as recited in claim 1, wherein said identification authentication information is transferred from said portable computer system to said interface device to uniquely identify said portable computer system to said interface device.

3. The method as recited in claim 1 wherein said b) comprises:
    recognizing said identification authentication information as an indication of unique identity of the source sending said information; and
    indexing said unique identity to a list of programmed identities.

4. The method as recited in claim 1 wherein said c) comprises:
    reacting to positive indexing match as an authenticated authorized identity and to negative indexing match as an unauthorized identity; and authorizing communications enablement in response to an authenticated authorized identity, and prohibiting communications in response to an unauthorized identity.

5. The method as recited in claim 1 wherein said d) comprises:

allowing said portable computer to synchronize with said other computer upon authorization of communication; and preventing synchronization upon prohibition of communication.

6. The method as recited in claim 1 wherein said e) comprises:

disclosing a specific key value with which said data is encrypted upon authorization of communication; and not disclosing said specific key value upon prohibition of communication.

7. A system for preventing unauthorized transfer of data between a portable computer system and a host system, comprising:

a) a portable computer device capable of synchronizing with said host;

b) an interface device separate from said portable computer device and said host, compatible to receive said portable computer device and capable of facilitating communication, authentication, and synchronization between said portable computer device and said host system;

c) an identification authenticating component embedded into said interface device and providing a unique identification signal corresponding to the unique identity thereof; and d) an identification authorizing component embedded into said interface device capable of determining if said unique identity is authorized for synchronization with said host system, and for correspondingly enabling and disabling synchronization between said portable computer and said host system, wherein decryption of encrypted data from said portable computer device is enabled provided said unique identity is authorized and wherein said decryption is disabled if said unique identity is not authorized.

8. A system as recited in claim 7 wherein said portable computer device comprises a palmtop computer.

9. A system as recited in claim 7 wherein said interface device comprises a palmtop computer cradle.

10. A system as recited in claim 7 wherein said synchronous communication is further encrypted with a specific key value from said identification authenticating tagging component such that unauthorized applications external to said portable computer system are locked out from deciphering data therefrom.

11. A system as recited in claim 7 wherein said identification authenticating tagging component is a magnetic key and said identification authentication reading component is a magnetic key reader.

12. A system as recited in claim 7 wherein said identification authenticating tagging component is a smart card and said identification authentication reading component comprises a smart card reader.

13. A system as recited in claim 7 wherein said identification authorizing component comprises is an application specific integrated circuit.

14. A system as recited in claim 7 wherein said identification authorizing component comprises a software program.

15. A system as recited in claim 7 wherein said identification authenticating tagging component is in direct electrical connection with said identification authentication reading component via contacts.

16. A system as recited in claim 7 wherein said identification authenticating tagging component is in contact free communication with said identification authentication reading component via an infrared communication mechanism.

17. A system as recited in claim 7 wherein said identification authenticating tagging component is in contact free communication with said identification authentication reading component via a transmitter/receiver modality and antenna array.

18. A system for preventing unauthorized transfer of data between a portable computer system and a system of data storage and communication, comprising:

a) a portable computer device capable of synchronizing with said system of data storage and communication;

b) an interface device separate from said portable computer device and said system of data storage and communication, compatible to receive said portable computer device and coupled with said system of data storage and communication and capable of facilitating communication between said portable computer device and said system of data storage, authentication, and communication;

c) an identification authenticating tagging and data encryption keying component embedded into said interface device and providing a unique identification signal and an encryption key cipher value corresponding to the unique identity thereof;

d) an identification authentication reading component capable of sensing and reading said unique identification signal, said identification authentication reading embedded into said interface device;

e) an identification authorizing component embedded into said interface device receiving input from said reading component and incorporated into the same one of said devices as said reading component, capable of determining if said unique identity is authorized for communication with said system of data storage, said identification authorizing component corresponding to said system of data storage, and synchronization and of correspondingly enabling and disabling synchronization between said portable computer and said system of data storage and communication; and f) an identification authorizing component further capable of enabling deciphering of encrypted communication from said portable computer device if said unique identity is authorized and disabling decryption if said unique identity is unauthorized.

19. A system as recited in claim 18 wherein said identification authorizing component incorporates software for determining if said unique identity is authorized for synchronization, for correspondingly enabling and disabling synchronization, and deciphering encrypted data from said portable computer device.

20. A system as recited in claim 18 wherein said interface device is a palmtop computer cradle.

21. A communication system comprising:

a host computer system comprising a communication port;

a portable electronic device comprising a communication port and an identity reference, said identity reference embedded into said portable electronic device; and a communication interface module separate from said host computer system for coupling and synchronization between said communication ports of said portable electronic device and said host computer system, said communication interface module comprising:

an authentication device for authenticating said identity reference; and a communication interface circuit coupled to said authentication device and for allowing direct communication between said portable electronic device and said host computer system provided said authentication device indicates a proper authentication of said identity reference with said host system, said communication interface circuit corresponding to said host system, and, otherwise, for disallowing communication between said portable electronic device and said host computer system, wherein decryption of encrypted data from said portable computer device is enabled provided said unique identity is authorized and wherein said decryption is disabled if said unique identity is not authorized.

22. A communication system as recited in claim 21 wherein said communication interface circuit comprises a decryption circuit.

23. A communication system as recited in claim 21 wherein said communication module contains a slot for receiving said communication port of said electronic device.

24. A communication system as recited in claim 21 wherein said identity reference is stored on a removable smart card.

25. A system as recited in claim 21 wherein said communication module is a palmtop computer cradle.

* * * * *